(12) United States Patent
Albrecht et al.

(10) Patent No.: US 8,048,546 B2
(45) Date of Patent: Nov. 1, 2011

(54) PERPENDICULAR MAGNETIC RECORDING DISK WITH ORDERED NUCLEATION LAYER AND METHOD FOR MAKING THE DISK

(75) Inventors: Thomas R Albrecht, San Jose, CA (US); Michael Konrad Grobis, San Jose, CA (US); Ernesto E. Marinero, Saratoga, CA (US); Hal J. Rosen, Los Gatos, CA (US); Ricardo Ruiz, San Bruno, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/639,975

(22) Filed: Dec. 16, 2009

(65) Prior Publication Data

US 2011/0143169 A1 Jun. 16, 2011

(51) Int. Cl.
*G11B 5/66* (2006.01)
(52) U.S. Cl. .................................... 428/831.2
(58) Field of Classification Search .................. None
See application file for complete search history.

(56) References Cited

U.S. PATENT DOCUMENTS

| | | | |
|---|---|---|---|
| 7,175,925 B2 * | 2/2007 | Chen et al. ............. | 428/831 |
| 7,347,953 B2 | 3/2008 | Black et al. | |
| 7,799,446 B2 * | 9/2010 | Mukai .................... | 428/831.2 |
| 2005/0214520 A1 * | 9/2005 | Oikawa et al. .......... | 428/323 |
| 2008/0084635 A1 | 4/2008 | Lee et al. | |
| 2008/0268288 A1 | 10/2008 | Jin | |
| 2009/0059430 A1 | 3/2009 | Dobisz et al. | |
| 2009/0226606 A1 * | 9/2009 | Inamura .................. | 427/131 |

FOREIGN PATENT DOCUMENTS

| | | |
|---|---|---|
| JP | 2002170227 | 6/2002 |
| JP | 2003317222 | 11/2003 |
| JP | 2008171489 | 7/2008 |

OTHER PUBLICATIONS

Thurn-Albrecht, T. et al., "Nanoscopic Templates from Oriented Block Copolymer Films", Advanced Materials 2000, 12, 787.
Black, C. T. et al., "Polymer self assembly in semiconductor microelectronics", IBM Journal of Research and Development, vol. 51, No. 5, p. 605 (2007).
Schull et al., "Orientationally Ordered (7×7) Superstructure of C60 on Au(111)", PRL 99, 226105 (2007).
Kim et al.,"Rapid Directed Self-Assembly of Lamellar Microdomains from a Block Copolymer Containing Hybrid", Proc. of SPIE vol. 6921, 692129, (2008).

(Continued)

*Primary Examiner* — Holly Rickman
(74) *Attorney, Agent, or Firm* — Thomas R. Berthold

(57) ABSTRACT

A continuous-media perpendicular magnetic recording disk with an oxide-containing granular Co alloy recording layer (RL) having minimal grain size dispersion has an ordered nucleation layer (ONL) formed below RL. The ONL has ordered nucleation sites arranged in a generally repetitive pattern. The nucleation sites are generally surrounded by non-nucleation regions of a different material than the nucleation sites. The Co-alloy grains of the subsequently deposited RL grow on the nucleation sites and the oxide of the RL become generally segregated on the non-nucleation regions. The ordered nucleation sites may be formed of a Ru-containing material and the non-nucleation regions may be formed of an oxide. The ONL is formed by nanoimprint lithography, preferably by a master mold fabricated with a method using self-assembling block copolymers for creating periodic nanometer scale features.

7 Claims, 10 Drawing Sheets

OTHER PUBLICATIONS

Kim et al., "Device-Oriented Directed Self-Assembly of Lamella Microdomains from a Block Copolymer Containing Hybrid", Proc. of SPIE vol. 6921, 69212B, (2008).

Kim et al., "Self-Aligned, Self-Assembled Organosilicate Line Patterns of ~20nm Half-Pitch from Block Copolymer Mediated Self-Assembly", Proc. of SPIE vol. 6519, 65191H, (2007).

Hitachi White Paper, "Density Multiplication and Improved Lithography by Directed Block Copolymer Assembly for Patterned Media at 1Tbit/in2 and Beyond", Hitachi Global Storage Technologies, 2008 http://www.hitachigst.com/tech/techlib.nsf/techdocs/616994B9CA608DAF862574B0007F1950/$file/Patterned_Media_WP.pdf.

* cited by examiner

PERPENDICULAR MAGNETIC RECORDING DISK WITH ORDERED NUCLEATION LAYER AND METHOD FOR MAKING THE DISK

BACKGROUND OF THE INVENTION

1. Field of the Invention

This invention relates generally to perpendicular magnetic recording media, such as perpendicular magnetic recording disks for use in magnetic recording hard disk drives, and more particularly to a continuous-media type of perpendicular magnetic recording disk with a granular cobalt-alloy recording layer having controlled grain size.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. One common type of perpendicular magnetic recording system uses a "dual-layer" media. This type of system is shown in FIG. 1 with a single write pole type of recording head. The dual-layer media includes a perpendicular magnetic data recording layer (RL) formed on a "soft" or relatively low-coercivity magnetically permeable underlayer (SUL). The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits. Other proposed types of perpendicular magnetic recording systems use write-assist methods, such as thermal or heat assisted magnetic recording (TAMR or HAMR) and microwave-assisted magnetic recording (MAMR), and do not require media with a SUL.

The disk in FIG. 1 is a "continuous-media" disk wherein the RL is a continuous layer of granular cobalt-alloy magnetic material that becomes formed into concentric data tracks containing the magnetically recorded data bits when the write head writes on the magnetic material. A variation of a continuous-media disk is a "discrete-track-media" disk, meaning that the RL is patterned into concentric data tracks formed of continuous magnetic material, but the data tracks are radially separated from one another by concentric nonmagnetic guard bands. Continuous-media disks, to which the present invention is directed, are to be distinguished from "bit-patterned-media" (BPM) disks, which have been proposed to increase data density. In BPM disks, the magnetizable material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to continuous-media disks wherein a single "bit" may have multiple magnetic domains separated by domain walls.

FIG. 2 is a schematic of a cross-section of a prior art perpendicular magnetic recording continuous-media disk showing the write field $H_w$ acting on the recording layer RL. The disk also includes the hard disk substrate, a seed or onset layer (OL) for growth of the SUL, an intermediate layer (IL) between the SUL and the RL, and a protective overcoat (OC). The IL is a nonmagnetic layer or multilayer structure, also called an "exchange break layer" or EBL, that breaks the magnetic exchange coupling between the magnetically permeable films of the SUL and the RL and facilitates epitaxial growth of the RL. While not shown in FIG. 2, a seed layer (SL) is typically deposited directly on the SUL to facilitate the growth of the IL. As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and an effective secondary write pole (SWP) beneath the RL. The SWP is facilitated by the SUL, which is decoupled from the RL by the IL and by virtue of its high permeability produces a magnetic mirror image of the RWH during the write process. This effectively brings the RL into the gap of the ARH and allows for a large write field $H_w$ inside the RL.

One type of material for the RL is a granular ferromagnetic cobalt (Co) alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce intergranular exchange coupling, which is responsible for high intrinsic media noise. Enhancement of grain segregation in the cobalt alloy RL is achieved by the addition of oxides, including oxides of Si, Ta, Ti, and Nb. These oxides tend to precipitate to the grain boundaries, and together with the elements of the cobalt alloy form nonmagnetic intergranular material. A perpendicular magnetic recording medium with a RL of a CoPtCr granular alloy with added $SiO_2$ is described by H. Uwazumi, et al., "CoPtCr—$SiO_2$ Granular Media for High-Density Perpendicular Recording", *IEEE Transactions on Magnetics*, Vol. 39, No. 4, July 2003, pp. 1914-1918. A perpendicular magnetic recording medium with a RL of a CoPt granular alloy with added $Ta_2O_5$ is described by T. Chiba et al., "Structure and magnetic properties of Co—Pt—$Ta_2O_5$ film for perpendicular magnetic recording media", *Journal of Magnetism and Magnetic Materials*, Vol. 287, February 2005, pp. 167-171. As shown in FIG. 2, a capping layer (CP), such as a granular Co alloy without added oxides or with smaller amounts of oxides than the RL, is typically deposited on the RL to mediate the intergranular coupling of the grains of the RL.

The Co alloy RL has substantially out-of-plane or perpendicular magnetic anisotropy as a result of the c-axis of its hcp crystalline structure being induced to grow substantially perpendicular to the plane of the layer during deposition. To induce this growth of the hcp RL, the IL onto which the RL is formed is also an hcp material. Ruthenium (Ru) and certain Ru alloys, such as RuCr, are nonmagnetic hcp materials that are used for the IL.

The enhancement of segregation of the magnetic grains in the RL by the additive oxides is important for achieving high areal density and recording performance. The intergranular oxide material not only decouples intergranular exchange but also exerts control on the size and distribution of the magnetic grains in the RL. Current disk fabrication methods achieve this segregated RL by growing the RL on a Ru or Ru-alloy IL that exhibits columnar growth of the Ru or Ru-alloy grains. The columnar growth of the IL is accomplished by sputter depositing it at a relatively high sputtering pressure. FIG. 3 is a transmission electron microscopy (TEM) image of a portion of the surface of a CoPtCr—$SiO_2$ RL formed on a Ru IL. FIG. 3 shows well-segregated CoPtCr magnetic grains separated by intergranular $SiO_2$. However, as is apparent from FIG. 3, there is a relatively wide variation in the size of the magnetic grains. A large grain size distribution is undesirable because it results in a variation in magnetic recording properties across the disk and because some of the smaller grains can be thermally unstable, resulting in loss of data.

What is needed is a continuous-media perpendicular magnetic recording disk that has a granular cobalt alloy RL with additive oxides with well-segregated magnetic grains of substantially the same size, i.e., minimal grain size distribution.

SUMMARY OF THE INVENTION

The invention relates to a continuous-media perpendicular magnetic recording disk with a granular Co alloy recording layer (RL) having minimal grain size dispersion and a method for making the disk. An ordered nucleation layer (ONL) is formed below the oxide-containing granular ferromagnetic Co alloy RL. The ONL has a lower portion and an upper portion with a generally planar surface onto which the RL is deposited. The upper portion of ONL has ordered nucleation sites arranged in a generally repetitive pattern that facilitate the growth of the Co alloy magnetic grains of the RL. The nucleation sites of the ONL are generally surrounded by non-nucleation regions of a different material than the nucleation sites. Thus the upper portion of layer provides two distinct regions of "chemical contrast" for the material of the RL, with the Co-alloy magnetic grains of the subsequently deposited RL growing on the nucleation sites, and the oxide of the RL being generally segregated on the non-nucleation regions. The ordered nucleation sites may be formed of a Ru-containing material and the non-nucleation regions may be formed of an oxide or nitride. The Ru-containing nucleation sites have a hexagonal close-packed (hcp) crystal structure for controlling the hcp crystal orientation in the granular Co alloy of the RL. The nucleation sites promote the growth of the hcp granular Co alloy of the RL so that its c-axis is oriented substantially perpendicular, thereby resulting in perpendicular magnetic anisotropy.

The ONL is formed by the method of this invention using nanoimprint lithography, preferably by a master mold fabricated with a method using self-assembling block copolymers for creating periodic nanometer scale features.

In another embodiment the ONL is a regular periodic pattern of molecular nanostructures. Molecular nanostructures include nanocrystals and molecular superstructures. Nanocrystals include small sub-100 nm sized crystalline particles whose core is composed of one or more materials such as CdSe, CdTe, PbSe, FePt, FeO and Si. Molecular superstructures are structures created by depositing molecular films on a substrate. Examples of molecular classes that can be used for this purpose are fullerenes (e.g., C60), polycyclic aromatic hydrocarbons (e.g., pentacene), and cyanines (e.g., porphyrin). A layer of the molecular nanostructures is located below a Ru-containing layer with the oxide-containing granular ferromagnetic Co alloy RL being deposited on the Ru-containing layer. The molecular nanostructures in the ONL serve as nucleation sites which create a generally regular pattern in the Ru-containing layer and RL.

For a fuller understanding of the nature and advantages of the present invention, reference should be made to the following detailed description taken together with the accompanying figures.

DETAILED DESCRIPTION OF THE INVENTION

Figure 1:
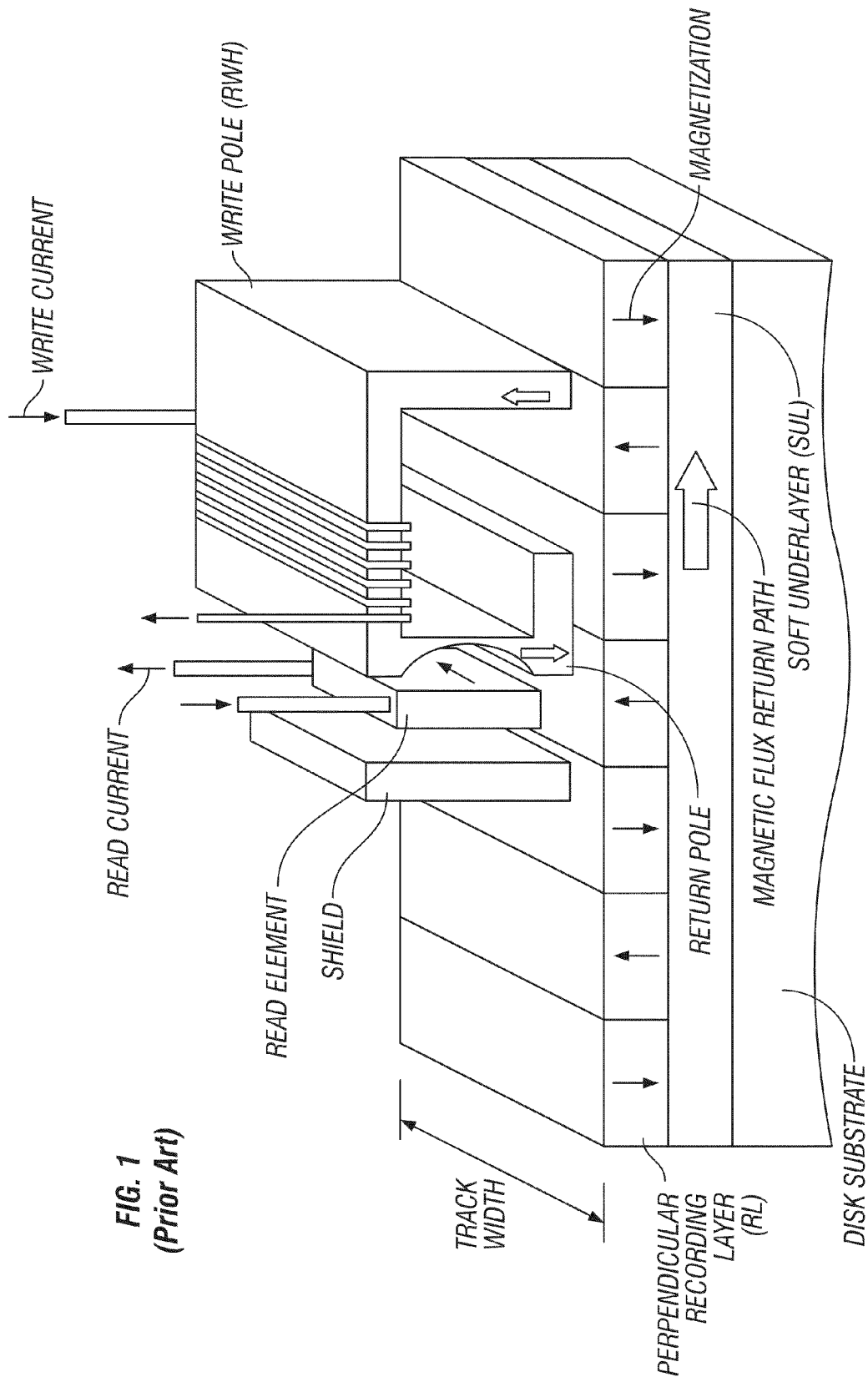
FIG. 1 is a schematic of a prior art perpendicular magnetic recording system.
Figure 2:
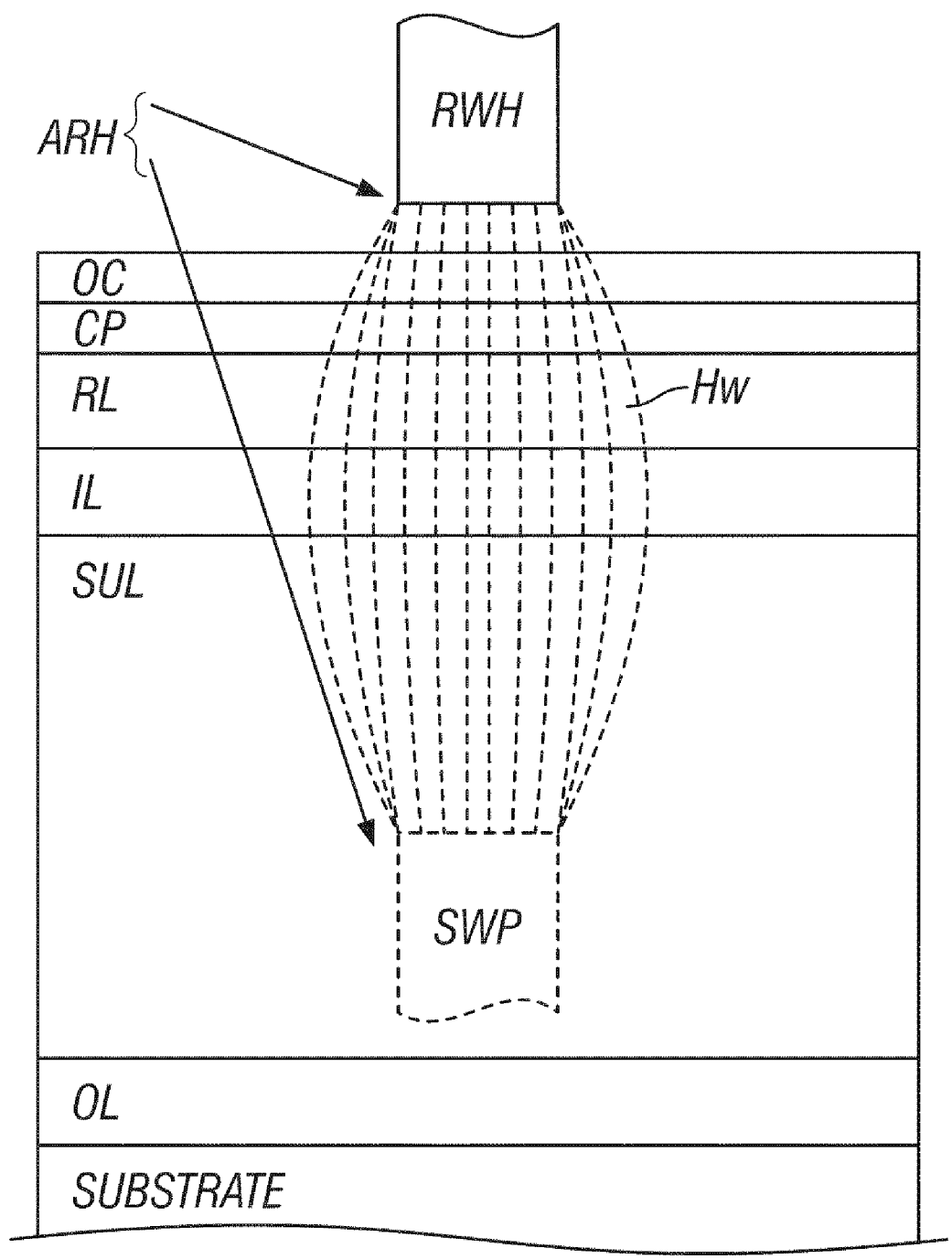
FIG. 2 is a schematic of a cross-section of a perpendicular magnetic recording disk according to the prior art and depicting the write field.
Figure 3:
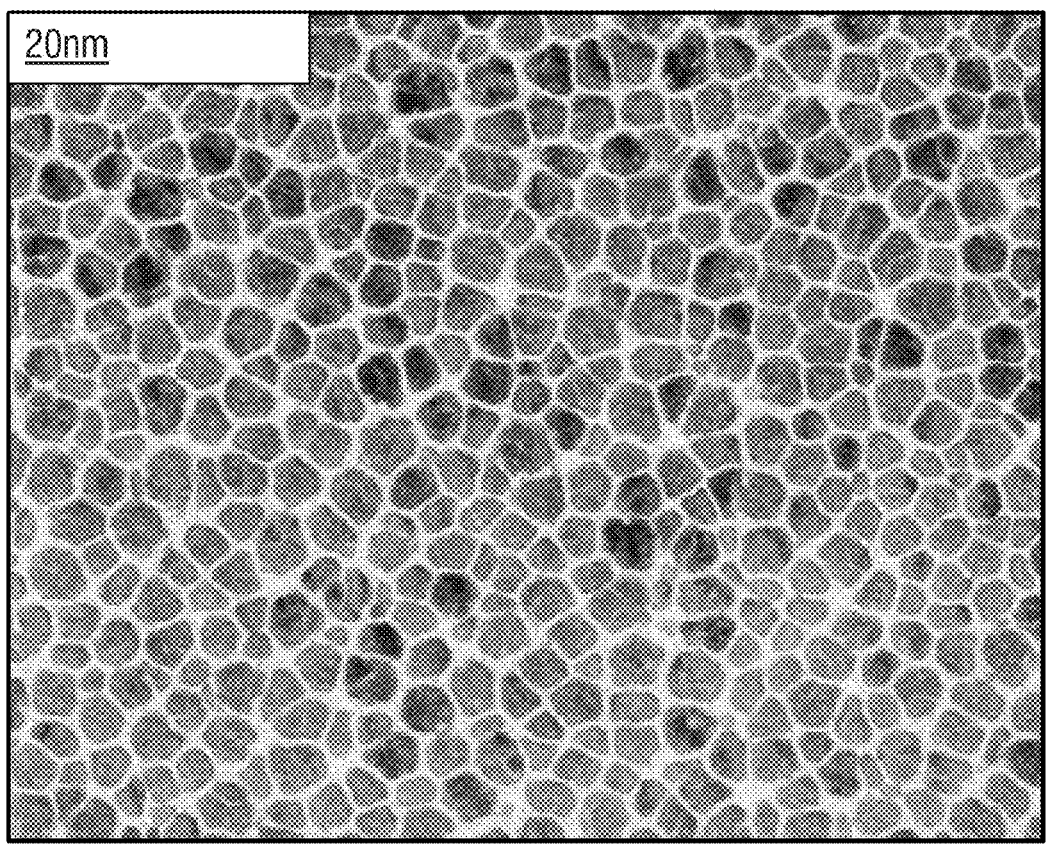
FIG. 3 is a transmission electron microscopy (TEM) image of a portion of a surface of a prior art CoPtCr—$SiO_2$ RL formed on a Ru IL.
Figure 4:
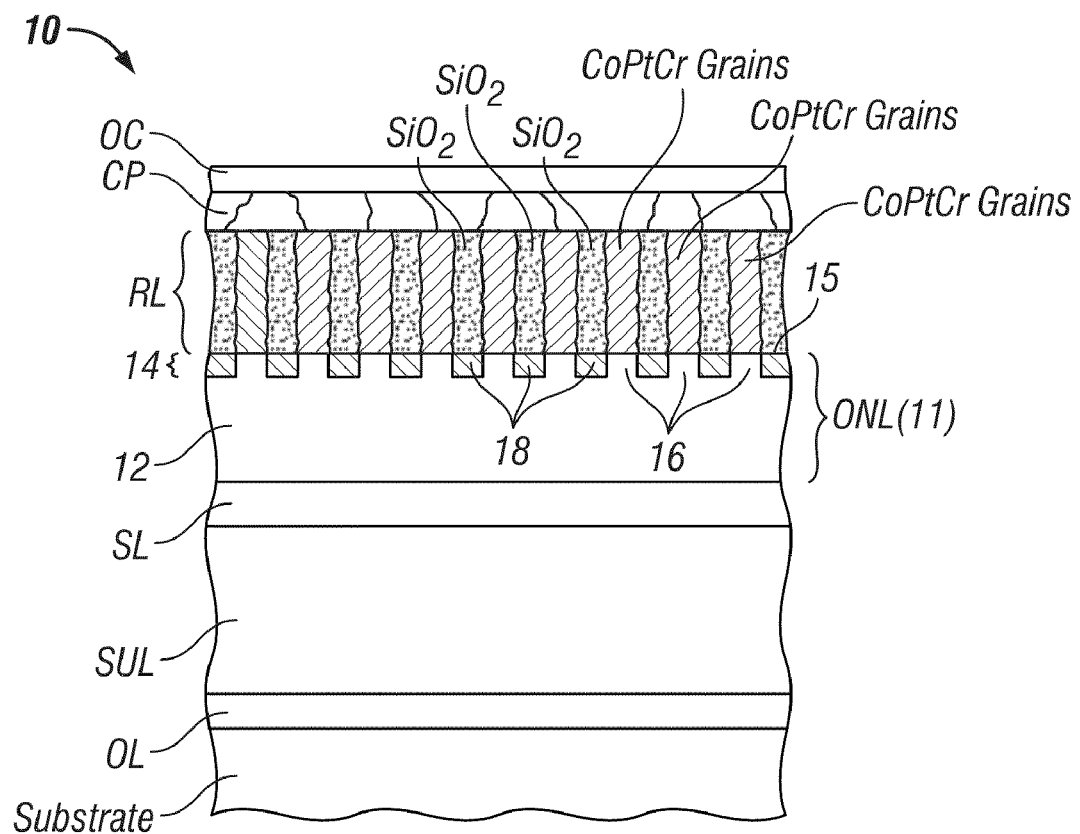
FIG. 4 is a side sectional view of the continuous-media perpendicular magnetic recording disk with the ordered nucleation layer (ONL) below the recording layer (RL) according to this invention.

FIG. 4 is a side sectional view of the continuous-media perpendicular magnetic recording disk 10 according to this invention. The nonmagnetic intermediate layer (IL) of the prior art disk of FIG. 2 is replaced with an IL that becomes fabricated into an ordered nucleation layer (ONL) 11. The ONL 11 has a lower portion 12 and an upper portion 14 with a substantially planar surface 15 onto which the RL is deposited. The RL is a continuous layer of a granular Co alloy with an oxide or oxides. The upper portion 14 of ONL 11 has ordered nucleation sites 16 arranged in a generally repetitive pattern. The nucleation sites 16 facilitate the growth of the Co alloy magnetic grains of the RL. The nucleation sites 16 are generally surrounded by non-nucleation regions 18 of a different material than the nucleation sites 16. Thus the upper portion 14 of layer 11 provides two distinct regions of "chemical contrast" for the material of the RL, with the Co-alloy magnetic grains of the subsequently deposited RL growing on the nucleation sites 16, and the oxide of the RL being generally segregated on the non-nucleation regions 18. In the preferred embodiment, the ordered nucleation sites 16 are formed of a Ru-containing material and the non-nucleation regions 18 are formed of an oxide or nitride. The Ru-containing nucleation sites 16 have a hexagonal close-packed (hcp) crystal structure for controlling the hcp crystal orientation in the granular Co alloy of the RL. The nucleation sites 16 promote the growth of the hcp granular Co alloy of the RL so that its c-axis is oriented substantially perpendicular, thereby resulting in perpendicular magnetic anisotropy. Ru is a commonly used material for the conventional IL in the prior art of FIG. 2, but other suitable materials include a metal selected from Ti, Re, and Os, and an alloy containing at least one element selected from Ti, Re, Ru, and Os, including Ru-based alloys such as a RuCr alloy. Thus any of these materials may be suitable for use as the material of the nucleation sites 16. The lower portion 12 of ONL 11 is preferably formed of the same material as the nucleation sites 16 (as shown in FIG. 4) or the same material as the non-nucleation regions 18, depending on the method of fabrication of the ONL 11 to be described below. The lower portion 12 is essentially that portion of the original IL that remains after the upper portion 14 has been fabricated.

FIG. 4 also depicts the other layers making up the disk 10. The various layers making up the disk 10 are located on the hard disk substrate. The substrate may be any commercially available glass substrate, but may also be a conventional aluminum alloy with a NiP or other known surface coating, or an alternative substrate, such as silicon, canasite or silicon-carbide. The SUL is located on the substrate, either directly on the substrate or directly on an adhesion layer or onset layer (OL). The OL facilitates the growth of the SUL and may be an AlTi alloy or a similar material with a thickness of about 2-5 nanometers (nm). The SUL may be a multilayered SUL formed of multiple soft magnetic layers separated by an interlayer film (such as Ru, Ir, or Cr) that acts as an antiferromagnetic (AF) coupling film to mediate antiferromagnetic exchange coupling between the two layers. This type of AF-coupled SUL is described in U.S. Pat. Nos. 6,686,070 B1 and 6,835,475 B2. However, instead of the AF-coupled SUL, the SUL may be a single-layer SUL (as shown in FIG. 4) or a non-AF-coupled laminated or multilayered SUL that is formed of multiple soft magnetic films separated by nonmagnetic films, such as films of carbon or SiN or electrically conductive films of Al or CoCr. The SUL layer or layers are formed of amorphous magnetically permeable materials such as alloys of CoNiFe, FeCoB, CoCuFe, NiFe, FeAlSi, FeTaN, FeN, FeTaC, CoTaZr, CoFeB, and CoZrNb. The thickness of the SUL is typically in the range of approximately 50-400 nm. An optional seed layer (SL) may be located on the SUL to facilitate the growth of the lower portion 14 of the ONL. If the lower portion 14 is a Ru-containing material, the SL may be formed of a layer of NiFe or NiW. The perpendicular magnetic RL is formed on and in direct contact with the ONL as a continuous layer of a granular ferromagnetic cobalt (Co) alloy, such as a CoPtCr alloy or a CoPtCrB alloy, with intergranular oxides, including oxides of one or more of Si, Ta, Ti, and Nb. The Co alloy has a hexagonal-close-packed (hcp) crystalline structure having the c-axis oriented substantially out-of-plane or perpendicular to the RL. A capping layer (CP) is deposited on the RL. The CP typically consists of a ferromagnetic granular Co alloy, like a CoPtCr or CoPtCrB alloy, for mediating or controlling the intergranular exchange coupling in the RL. Thus the CP may have a greater amount of Cr and/or B than the RL, or a lesser amount of oxides than the RL. For example, the CP may have substantially the same Co alloy composition as the RL but have no oxides. As a result, the individual Co alloy grains of the CP are larger than the Co alloy grains of the RL and generally overlap multiple grains of the RL, as depicted by the wavy lines in the CP. The OC formed on the RL may be an amorphous "diamond-like" carbon film or other known protective overcoat, such as silicon nitride (SiN).

Figure 5A:
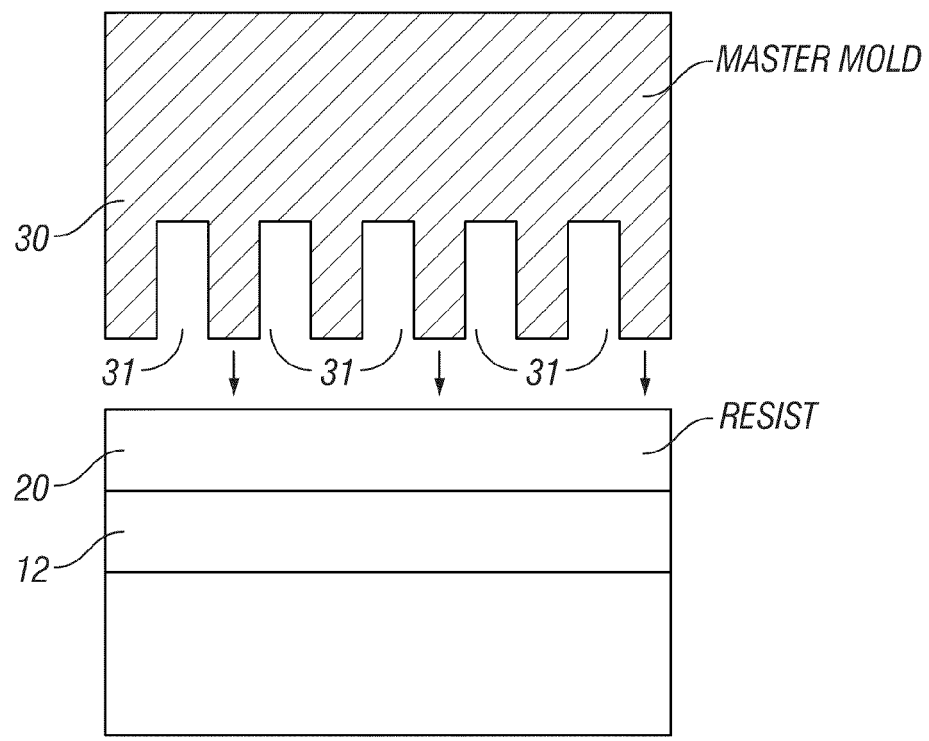
FIGS. 5A-5F are side sectional views illustrating steps in one embodiment of the method of forming the ordered nucleation layer of this invention.
Figure 5B:
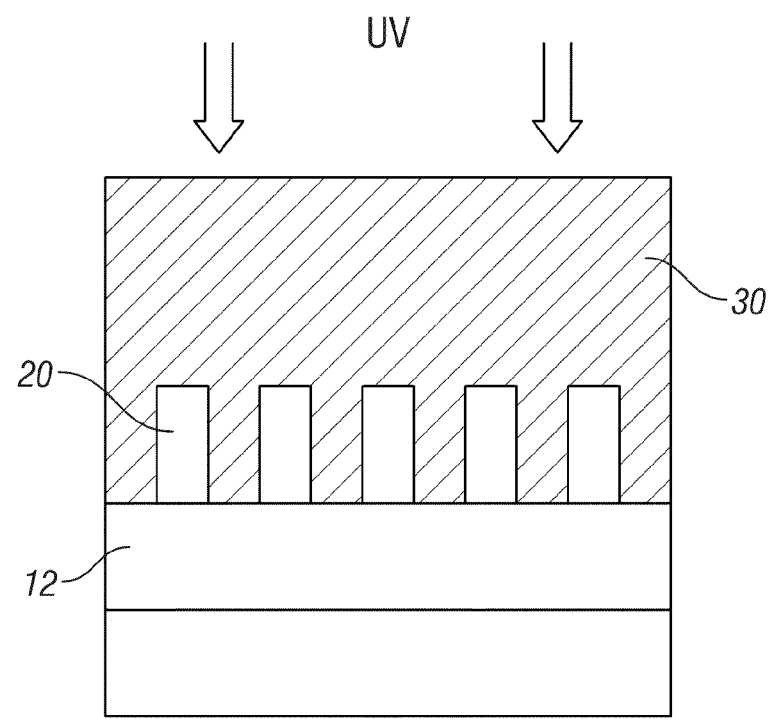
Figure 5C:
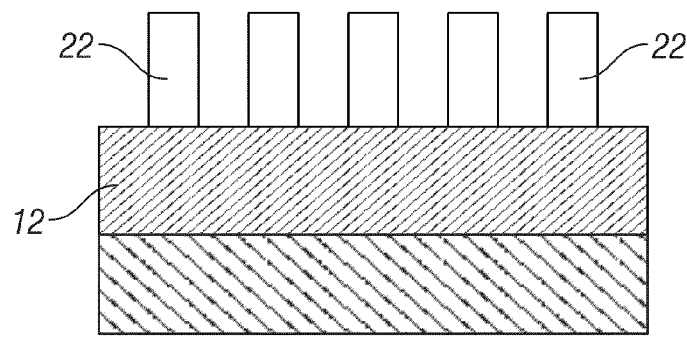
Figure 5D:
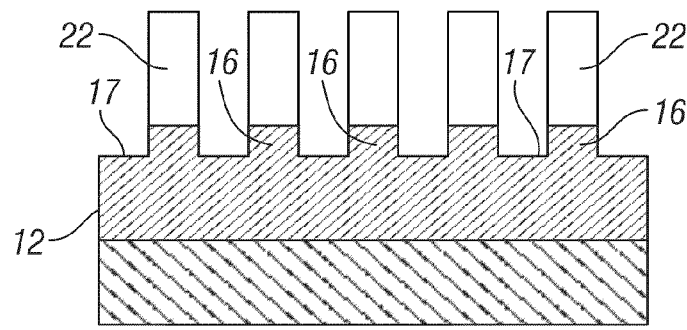
Figure 5E:
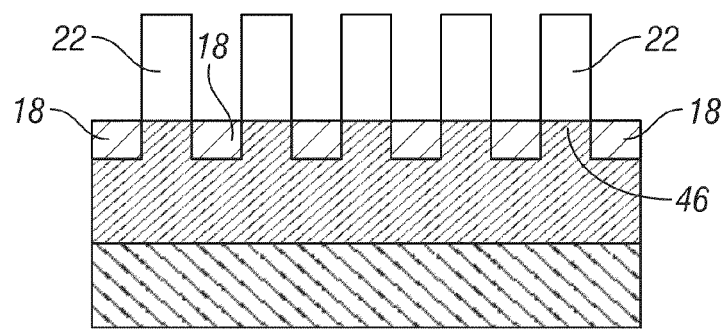
Figure 5F:
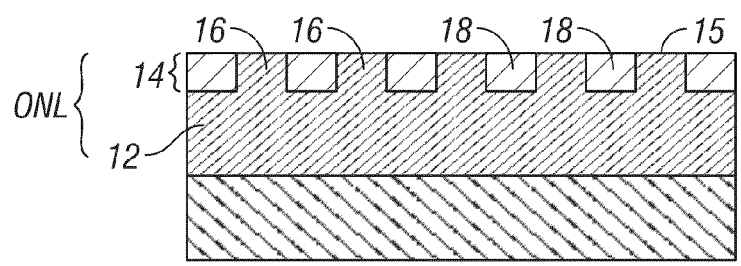

In this invention the ONL is formed by nanoimprint lithography, preferably by a master mold fabricated with a method using self-assembling block copolymers for creating periodic nanometer (nm) scale features. FIGS. 5A-5F are side sectional views illustrating steps in one embodiment of the method of forming the ONL. First the layers up to and including the layer of material that will serve as the lower portion 12 of the ONL are deposited in the conventional manner of fabricating a magnetic recording disk, which is typically by sputter deposition. In this example the material of lower portion 12 is Ru. Then, as shown in FIG. 5A, the structure is removed from the sputtering apparatus, a layer of nanoimprint liquid resist 20 is deposited on portion 14, and the structure is located below a nanoimprinting master mold 30. In this example the master mold 30 contains a periodic pattern of holes 31. The nanoimprint resist is preferably a resist that is curable by ultraviolet (UV) radiation. In FIG. 5B, the nanoimprinting master mold 30 is pressed over the resist layer 20, forcing the liquid resist material 20 into the holes 31, and the resist is then exposed to UV radiation to cure the resist. In FIG. 5C, the master mold 30 has been removed, leaving a periodic pattern of pillars 22 of resist material on lower portion 12. In FIG. 5D, the exposed portions of Ru in lower portion 12 are etched or milled approximately 5-20 Å to produce recessed regions 17, leaving raised Ru nucleation sites 16 below the resist pillars 22. Then, in FIG. 5E material that will form the non-nucleation regions 18 is deposited over the pillars 22 and underlying nucleation sites 16 to substantially the same thickness of the recess, i.e., 5-20 Å to obtain a substantially planar surface. In this example the material for the non-nucleation regions 18 is a silicon oxide, e.g., $SiO_2$. Next, the pillars 22 of resist layer are removed by a dry or wet etch, leaving behind the upper portion 14 of the ONL. The upper portion 14 is an ordered array or periodic pattern of Ru nucleation sites 16 that are surrounded by and generally contiguous with non-nucleation regions 18 of $SiO_2$. As shown in FIG. 5F, the nucleation sites 16 and the generally contiguous non-nucleation regions 18 form a substantially planar surface 15. As used herein, "substantially planar" means that the heights of the surfaces of the nucleation sites and the height of the regions surrounding the nucleation sites, e.g., non-nucleation regions 18 in FIG. 5F, are within at least 3 nm of one another, and preferably within 1 nm of one another. The nucleation sites 16 have a lateral or in-plane width dimension preferably in the range of about 4 to 25 nm and a lateral or in-plane center-to-center spacing preferably in the range of about 8 to 50 nm.

In a first alternative to the method of FIGS. 5A-5F, a very thin, e.g., 3 nm or less and preferably 1 nm or less, film of non-nucleation material like $SiO_2$ is deposited on top of the Ru layer 12 before deposition of the resist layer 20 (see FIG. 5A). In this example, the resist layer is imprinted such that the imprinted pattern forms holes in the resist. Then the thin $SiO_2$ film is etched through the holes using the resist matrix of holes as a mask, like in FIG. 5D, to remove just the $SiO_2$ in the exposed regions, leaving nucleation sites of Ru. The resist matrix is then removed, leaving the non-nucleation regions of $SiO_2$ that were beneath the resist. Because the film of $SiO_2$ is preferably only 1 nm thick the resulting surface of contiguous nucleation sites and non-nucleation regions is substantially planar. If a pillar-tone resist pattern like in FIG. 5C were to be used, then the $SiO_2$ film would be deposited first followed by a very thin (3 nm or less and preferably 1 nm or less) Ru film. The Ru film would then be etched through the resist pillars 22 to generate Ru nucleation sites surrounded by $SiO_2$ non-nucleation regions.

In a second alternative to the method of FIGS. 5A-5F, a very thin, e.g., 3 nm or less and preferably 1 nm or less, film of non-nucleation material like $SiO_2$ is deposited over the resist pillars 22 in FIG. 5C to form thin non-nucleation regions in the exposed regions. In this method, no etching is required. The resist pillars 22 are then removed, leaving nucleation sites of Ru that were beneath them. Because the film of $SiO_2$ is preferably only 1 nm thick the resulting surface of contiguous nucleation sites and non-nucleation regions is substantially planar. Alternatively, a $SiO_2$ film is deposited on top of the substrate in FIG. 5A (i.e., instead of the Ru layer 12) and a resist pattern is imprinted so as to form a resist matrix of holes instead of pillars 22. A very thin (3 nm or less and preferably 1 nm or less) Ru film is then deposited on top of the resist matrix and into the holes. The resist is then removed by a wet or dry process leaving behind an array of Ru nucleation sites surrounded by $SiO_2$ non-nucleation regions.

The structure shown in FIG. 5F is then placed back into a sputtering apparatus where the RL and OC are deposited. The RL is typically co-sputtered from a Co-alloy target, such as CoPtCr or CoPtCrB, and an oxide target, such as $SiO_2$. The upper portion 14 of the ONL now has two regions of chemical contrast. Thus, as the RL grows on the upper portion 14 of the ONL, the Co-alloy grains grow on the Ru nucleation sites 16 and the SiO$_2$ tends to form as intergranular material on the non-nucleation regions 18. As depicted schematically in FIG. 4, this results in a RL with Co alloy grains of generally uniform size, i.e., minimal grain size distribution, that are well-segregated by the intergranular oxide material.

In the example of the method shown in FIGS. 5A-5F, the lower portion 12 is Ru, the same material as the nucleation sites 16. However the ONL can also be fabricated by beginning with a lower portion 12 formed of SiO$_2$. In this example, the master mold would have a reverse image to that of master mold 30 in FIG. 5A, so that after resist curing and removal of the master mold the resist layer would be a "hole" pattern. The exposed portions of SiO$_2$ in lower portion 12 are then etched or milled through the holes, leaving recessed portions of SiO$_2$ in the holes of the resist layer. Then the holes are back-filled with Ru to the same thickness as the thickness of the SiO$_2$ that was etched or milled away. After resist removal, the structure would be essentially identical to the structure shown in FIG. 5F, with the exception that lower portion 12 of the ONL would be formed of the same material as the non-nucleation regions 18, in this example SiO$_2$.

Figure 6A:
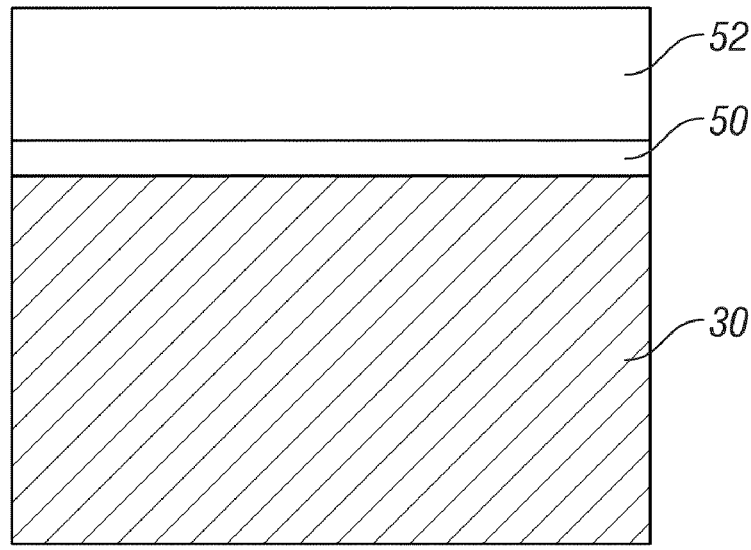
FIGS. 6A-6F illustrate the method of fabricating the nanoimprinting master mold using self-assembling block copolymers.
Figure 6B:
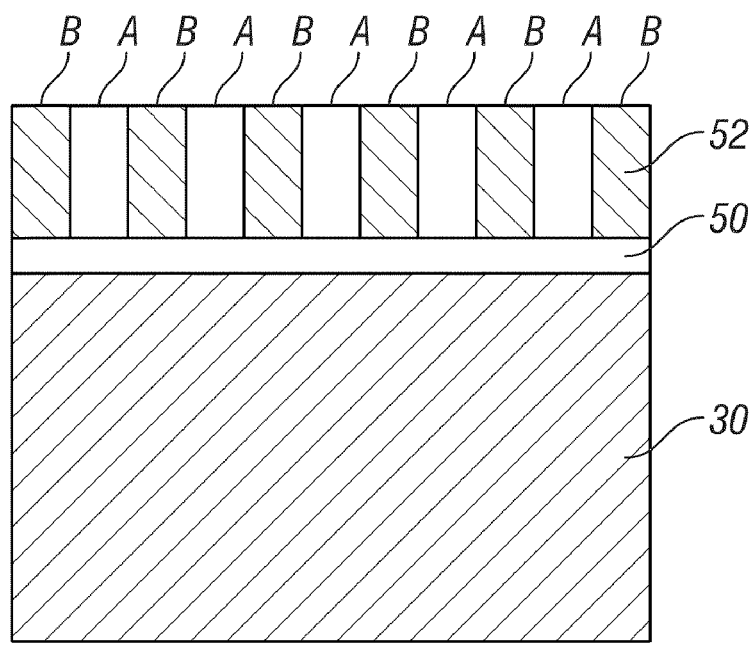
Figure 6C:
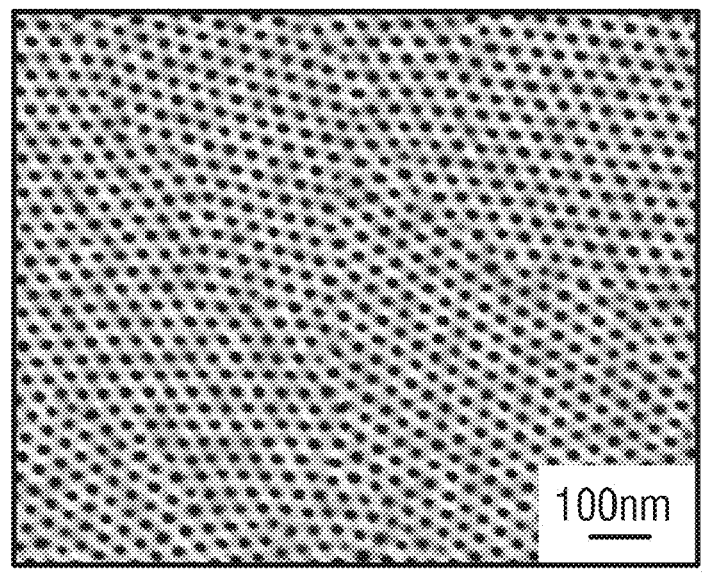
Figure 6D:
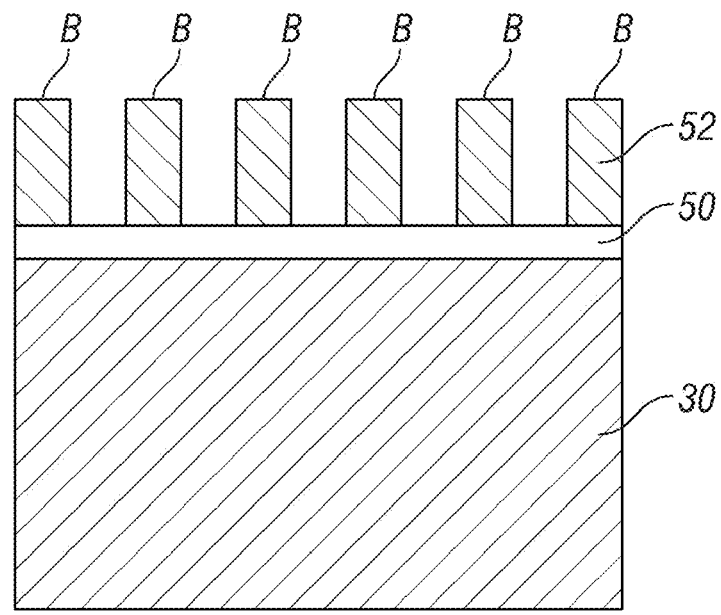
Figure 6E:
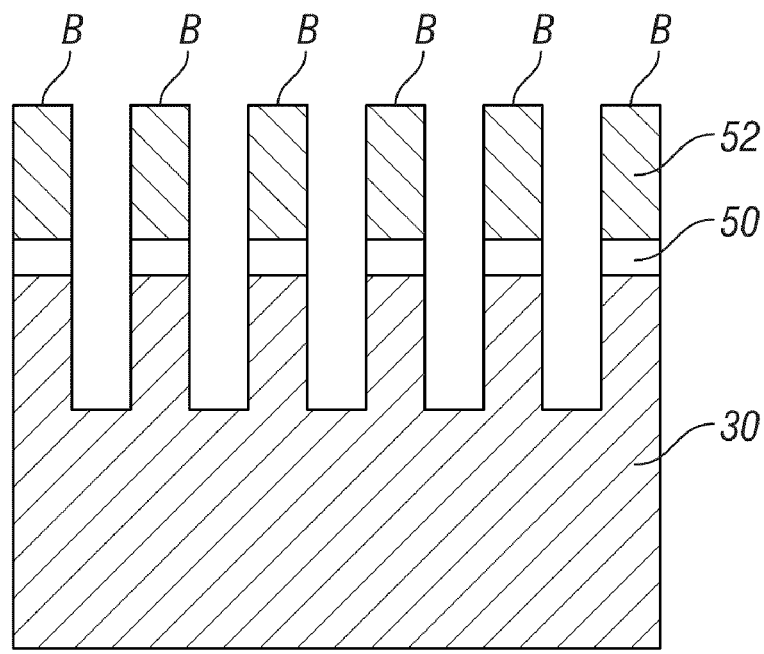
Figure 6F:
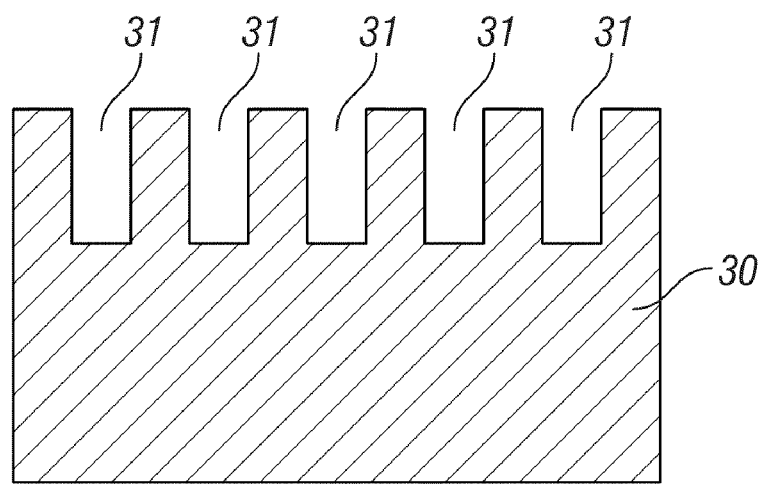

The method for fabricating the nanoimprinting master mold 30 using self-assembling block copolymers will now be described with FIGS. 6A-6F. The nanoimprinting master mold 30 is to be formed from a suitable substrate material like single-crystal Si, amorphous Si, silica, quartz, silicon nitride, carbon, tantalum, molybdenum, chromium, alumina or sapphire. In FIG. 6A the surface of substrate 30 may be treated with a suitable polymer brush layer 50 to influence the orientation of the subsequent block copolymer film. This is followed by deposition of a thin film 52 of a self-assembling block copolymer material. A self-assembling block copolymer typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. In FIG. 6B, the film 52 of block copolymer material has been annealed so that the block copolymer microphase separates into nanometer scale regular arrays of perpendicularly oriented cylinder domains of material B embedded in a matrix of material A. FIG. 6C is a scanning electron micrograph (SEM) of a top view of a block copolymer film after annealing and depicts the cylinders of material B embedded in a matrix of material A. In FIG. 6D, the A material is then selectively removed to leave a template with a periodic pattern of cylindrical pillars of B material. In FIG. 6E the exposed brush film 50 and underlying substrate 30 is then etched through the pillars of material B to the depth desired for the holes of the master mold. In FIG. 6F the remaining portions of brush film 50 and the pillars of B material are removed, leaving the master mold 30 with the pattern of holes 31. This master mold 30 is then used to fabricate the ONL, as shown in FIG. 5A.

There are many types of block copolymers that can be used for forming the self-assembled periodic pattern shown in FIG. 6C. Selective removal of one of the components A or B without having to remove the other results in orderly arranged structural units of the un-removed component. There are numerous references describing self-assembling block copolymers, including U.S. Pat. No. 7,347,953 B2; Kim et al., "Rapid Directed Self-Assembly of Lamellar Microdomains from a Block Copolymer Containing Hybrid", *Proc. of SPIE* Vol. 6921, 692129, (2008); Kim et al., "Device-Oriented Directed Self-Assembly of Lamella Microdomains from a Block Copolymer Containing Hybrid", *Proc. of SPIE* Vol. 6921, 69212B, (2008); and Kim et al., "Self-Aligned, Self-Assembled Organosilicate Line Patterns of ~20 nm Half-Pitch from Block Copolymer Mediated Self-Assembly", *Proc. of SPIE* Vol. 6519, 65191H, (2007).

Specific examples of suitable block copolymers that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

The specific self-assembled periodic patterns formed by the block copolymer are determined by the molecular volume ratio between the first and second polymeric block components A and B. When the ratio of the molecular volume of the second polymeric block component B over the molecular volume of the first polymeric block component A is less than about 80:20 but greater than about 60:40, the block copolymer will form an ordered array of cylinders composed of the first polymeric block component A in a matrix composed of the second polymeric block component B. When the ratio of the molecular volume of the first polymeric block component A over the molecular volume of the second polymeric block component B is less than about 60:40 but is greater than about 40:60, the block copolymer will form alternating lamellae composed of the first and second polymeric block components A and B. In the present invention, the un-removed component is to be used as an etch mask, as shown in FIG. 6D, so ordered arrays of alternating lamellae and alternating cylinders are of interest.

The periodicity or bulk period ($L_0$) of the repeating structural units in the periodic pattern is determined by intrinsic polymeric properties such as the degree of polymerization N and the Flory-Huggins interaction parameter $\chi$. $L_0$ scales with the degree of polymerization N, which in turn correlates with the molecular weight M. Block copolymers are available that can achieve a $L_0$ be between about 8 to 50 nm. Therefore, by adjusting the total molecular weight of the block copolymer of the present invention, the bulk period ($L_0$) of the repeating structural units can be selected. The block copolymer material may be the diblock copolymer polystyrene-block-polymethylmethacrylate (PS-b-PMMA). For example, a symmetric PS-b-PMMA with a total molecular weight of Mw=46 Kg/mol displays an $L_0$ of approximately 32 nm whereas one with Mw=36 Kg/mol exhibits an $L_0$ of approximately 27 nm. Other values for $L_0$ are known and described by Black, C. T., Ruiz, R., et al., "Polymer self assembly in semiconductor microelectronics", *IBM Journal of Research and Development*, Volume 51, Number 5, Page 605 (2007). If the block copolymer material is (PS-b-PMMA), the PMMA can be selectively removed, for example, by use of ultraviolet (UV) radiation followed by a rinse in a selective solvent, as described by Thurn-Albrecht, T. et al., "Nanoscopic Templates from Oriented Block Copolymer Films", *Advanced Materials* 2000, 12, 787.

To form the self-assembled periodic patterns, the block copolymer is first dissolved in a suitable solvent system to form a block copolymer solution, which is then applied onto a surface to form the thin block copolymer film, followed by annealing of the thin block copolymer layer, which causes phase separation between the different polymeric block components contained in the block copolymer. The solvent system used for dissolving the block copolymer and forming the block copolymer solution may comprise any suitable solvent, including, but not limited to: toluene, propylene glycol monomethyl ether acetate (PGMEA), propylene glycol monomethyl ether (PGME), and acetone. The block copolymer solution can be applied to the substrate surface by any suitable techniques, including, but not limited to: spin casting, coating, spraying, ink coating, dip coating, etc. Preferably, the block copolymer solution is spin cast onto the substrate surface to form a thin block copolymer layer. After application of the thin block copolymer layer onto the substrate surface, the entire substrate is annealed to effectuate microphase segregation of the different block components contained by the block copolymer, thereby forming the periodic patterns with repeating structural units. The polymer brush material 50 may be a neutral layer of a material that does not show a strong wetting affinity by one of the polymer blocks over the other. The purpose of the neutral layer is to tune the surface energy adequately to promote the desired domain orientation (perpendicular lamellae or parallel cylinders) and to provide the adequate wetting conditions. The neutral layer can be, for example, a hydroxyl-terminated polystyrene brush of lower molecular weight than the block copolymer used. The brush layer 50 is spin-coated on the substrate 30 to a thickness of about 1-10 nm (below 6 nm is preferred).

The block copolymer films in the above-described techniques self-assemble without any direction or guidance. This undirected self-assembly results in patterns with minor defects so it is not practical for applications that require precise long-range ordering. This lack of precise long-range ordering can be seen in the SEM of FIG. 6C. However, precise long-rang ordering of the nucleation sites in the ONL is not required for this invention, where a continuous granular Co-alloy with intergranular oxides is deposited over the ONL that is fabricated with the master mold.

In another embodiment of the method of forming the ONL with a chemical contrast pattern, ion implantation is used. This method can be explained beginning with the structure of FIG. 5C. Using this resist layer with the ordered array of pillars 22 as a mask, high energy ions are implanted into the exposed regions of the Ru of the lower portion 12 of the ONL. For example, high energy oxygen atoms can be implanted to form non-nucleation regions 18 of ruthenium oxide. After resist removal the upper portion 14 of the ONL is an ordered array of Ru nucleation sites 16 surrounded by non-nucleation regions 18 of ruthenium oxide. Because ion implantation does not remove material there is no need for etching followed by re-filling and the upper portion 14 of the ONL retains its inherent substantially planar surface 15.

In another embodiment of the method of forming the ONL with a chemical contrast pattern, molecular nanostructures are used. Molecular nanostructures include nanocrystals and molecular superstructures.

Nanocrystals include small sub-100 nm sized crystalline particles whose core is composed of one or more materials such as CdSe, CdTe, PbSe, FePt, FeO and Si. Nanocrystals can be synthesized in a variety of sizes and with narrow size distributions. For example, CdSe nanocrystals are commercially available with diameters ranging from 2-7 nm and diameter distributions of less than 10%. Nanocrystals can be dispersed into well-ordered films by several well-established techniques such as spin coating and immersion.

Molecular superstructures are structures created by depositing molecular films on a substrate. Examples of molecular classes that can be used for this purpose are fullerenes (e.g., C60), polycyclic aromatic hydrocarbons (e.g., pentacene), and cyanines (e.g., porphyrin). The substrate can be a component of the magnetic stack or a seed layer composed of a noble metal (e.g., Au) or an inorganic (e.g. Si) thin film. C60 is a spherical molecule that can interact strongly with metallic films. The C60-metal interaction on gold (Au) films, for example, produces superstructures with a periodicity of 5 nm, which is nearly an order of magnitude greater than the 0.7 nm C60 diameter (PRL 99, 226105 (2007)). The molecular superstructures can be formed by depositing a film of medium sized (0.5-1 nm) molecules via thermal evaporation. While the size of the molecule is an important length scale for the ordered film, molecular films frequently form superstructures that result from the molecule-surface interaction. One embodiment of the ONL in this invention uses a C60 monolayer and a Au seed layer for the C60 monolayer on top of the SUL.

In the method of making the ONL with molecular nanostructures, all of the layers of the disk, including the SUL and up to the layer onto which the molecular nanostructures are to be deposited, are deposited in the conventional manner, such as sputter deposition. Then, if spin-coating or liquid immersion is required, the structure is removed from the sputtering apparatus for deposition of the molecular nanostructures. The molecular nanostructures can be deposited using various standard molecular deposition techniques, such as vapor exposure, thermal evaporation, spin-coating, or liquid immersion, depending on the molecule used. After the molecular nanostructures are deposited, additional processing may be performed, if necessary, such as thermal annealing or the deposition of further adhesion/seed layers, before resuming the deposition of the remaining magnetic stack components. The procedure for using nanocrystals as the ordering layer is similar to that of molecular superstructures. However, nanocrystals can usually only be deposited using spin-coating or liquid immersion. Such deposition techniques will require a separate machine dedicated for these depositions.

If the molecular nanostructures are to be deposited on top of the SUL, an adhesion layer or seed layer, such as Au, Ta, or NiW, can be deposited on top of the SUL prior to the deposition of the molecular nanostructures. The adhesion layer or seed layer composition and thickness is selected to promote proper ordering in the ONL and to protect the SUL from damage during the deposition of the molecular nanostructures.

Figure 7:
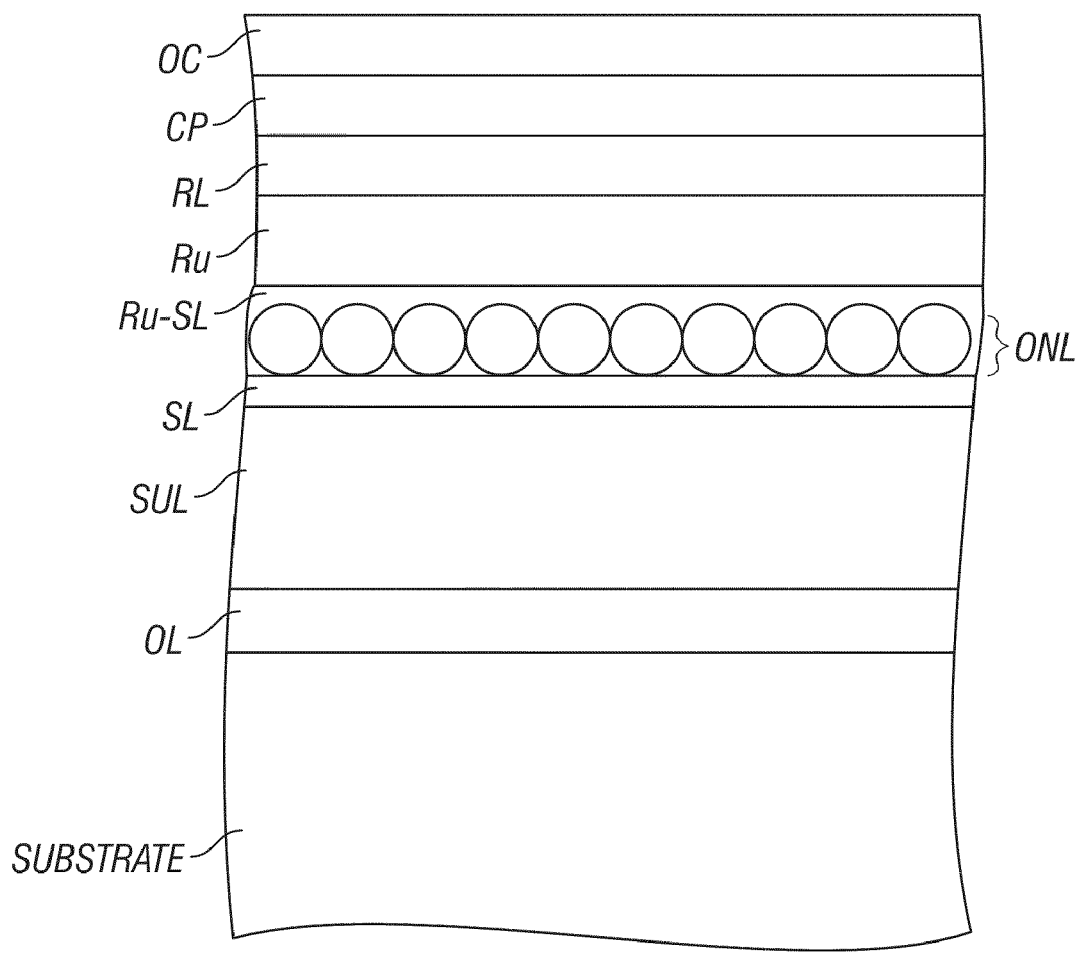
FIG. 7 is a side sectional view of the continuous-media perpendicular magnetic recording disk with the ordered nucleation layer (ONL) below the recording layer (RL) according to an embodiment of this invention that uses molecular nanostructures.

FIG. 7 is a side sectional view of the continuous-media perpendicular magnetic recording disk with the ordered nucleation layer (ONL) below the recording layer (RL) according to an embodiment of this invention that uses molecular superstructures, e.g. a layer of C60 molecules. The embodiment with nanocrystals is similar, but with the molecular layer replaced by a nanocrystal layer. A protection layer for the SUL and/or a seed layer (SL) for the C60 layer is deposited on the SUL. A seed layer for the subsequently deposited Ru or Ru-containing layer (Ru-SL) is deposited on the ONL. The Ru-SL may be a Au/NiW bilayer with a thickness of about 1 to 5 nm. Then a Ru layer or Ru-containing layer is deposited to a thickness of about 10 to 25 nm on the Ru-SL. The conventional RL, CP and OC are then deposited in the conventional manner on the Ru layer. The C60 molecules in the ONL promote more uniform distribution of topographic features and nucleation centers. The ONL then creates a generally regular pattern in the Ru seed layer, which in turn guides more homogenous grain formation in the Ru layer and the RL.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

The invention claimed is:

1. A continuous-media perpendicular magnetic recording disk comprising:
    a substrate;
    an underlayer on the substrate;
    a ruthenium-containing layer on the underlayer and selected from a layer of ruthenium (Ru) and a layer of a Ru-based alloy, the upper surface of the Ru-containing layer having an ordered array of recesses having a depth greater than or equal to 5 Å and less than or equal to 20 Å, the depth of the recesses being less than the thickness of the Ru-containing layer;
    an oxide selected from an oxide of Si, Ta, Ti and Nb in said recesses; and
    a perpendicular magnetic recording layer on the Ru-containing layer and comprising a continuous layer of granular ferromagnetic Co alloy and an oxide the same as the selected oxide in said recesses of the Ru-containing layer, the Co alloy in the recording layer being in contact with the non-recessed regions of the upper surface of the Ru-containing layer and the oxide in the recording layer being in contact with the oxide in said recesses of the Ru-containing layer.

2. The disk of claim 1 wherein the oxide in said recesses and in the recording layer is an oxide of Si.

3. The disk of claim 1 wherein the Ru-containing layer is a Ru layer.

4. The disk of claim 1 wherein the underlayer is a soft underlayer (SUL) of magnetically permeable material and wherein the Ru-containing layer is an exchange break layer between the SUL and the recording layer for preventing magnetic exchange coupling between the SUL and the recording layer.

5. The disk of claim 4 further comprising a seed layer between the SUL and the Ru-containing layer.

6. A continuous-media perpendicular magnetic recording disk comprising:
    a substrate;
    an underlayer on the substrate;
    a perpendicular magnetic recording layer on the underlayer and comprising a continuous layer of granular ferromagnetic Co alloy and one or more oxides of one or more of Si, Ta, Ti and Nb; and
    an ordered nucleation layer between the underlayer and the recording layer, the ordered nucleation layer comprising an ordered array of molecular nanostructures for the Co alloy of the recording layer, the molecular nanostructures being selected from nanocrystals selected from CdSe, CdTe, PbSe, FePt, FeO and Si and molecular superstructures of molecules selected from fullerenes, polycyclic aromatic hydrocarbons, and cyanines.

7. The disk of claim 6 wherein the fullerenes are C60 molecules.

* * * * *